US005623319A

United States Patent [19]
Hill et al.

[11] Patent Number: 5,623,319
[45] Date of Patent: Apr. 22, 1997

[54] GHOST CANCELLATION REFERENCE SIGNAL DETECTION AND SYNCHRONIZATION CIRCUIT

[75] Inventors: Rae L. Hill, Jefferson City; Chris L. Spearman, Knoxville, both of Tenn.

[73] Assignee: Philips Electronics North American Corp., New York, N.Y.

[21] Appl. No.: 539,567

[22] Filed: Oct. 5, 1995

[51] Int. Cl.⁶ .................................................... H04N 5/21
[52] U.S. Cl. ............................................ 348/614; 348/607
[58] Field of Search ...................................... 348/614, 607, 348/571; 358/36, 167, 905; H04N 5/21, 5/213

[56] References Cited

U.S. PATENT DOCUMENTS

| | | | |
|---|---|---|---|
| 5,293,234 | 3/1994 | Ko | 348/614 |
| 5,325,130 | 6/1994 | Miller et al. | 348/614 |
| 5,335,020 | 8/1994 | Dieterich | 348/614 |
| 5,361,102 | 11/1994 | Roy et al. | 348/614 |
| 5,363,144 | 11/1994 | Park | 348/614 |
| 5,389,977 | 2/1995 | Lee | 348/614 |

FOREIGN PATENT DOCUMENTS

| | | | |
|---|---|---|---|
| 58-87981 | 5/1983 | Japan | 358/905 |
| 10776 | 1/1992 | Japan | H04N 5/21 |

*Primary Examiner*—John K. Peng
*Assistant Examiner*—Chris Grant
*Attorney, Agent, or Firm*—Edward W. Goodman

[57] ABSTRACT

A circuit for detecting and synchronizing a ghost cancellation reference (GCR) signal in a television video signal, includes a circuit for receiving at least one field of an input video signal, a circuit for finding a maximum correlation peak value in a field of said input video signal, a circuit for scaling the maximum correlation peak value to a lower predetermined value for detection for forming a scaled peak value, a circuit for synchronizing a next field of the video signal using the scaled peak value, and a circuit for predicting a future position of the GCR signal.

5 Claims, 8 Drawing Sheets

GHOST CANCELLATION REFERENCE SIGNAL DETECTION AND SYNCHRONIZATION CIRCUIT

BACKGROUND OF THE INVENTION

1. Field of the Invention

The subject invention relates to a circuit for detecting and synchronizing a ghost cancellation reference signal contained in a television signal.

2. Description of the Related Art

U.S. Pat. Nos. 5,047,859 and 5,121,211 both to Koo disclose a signal which, when transmitted with a standard television signal, enables a corresponding circuit to correct said signal thereby eliminating "ghost", i.e., errors in the signal arising from, for example, reflections from buildings, terrain, etc. For a ghost canceler to be effective, the ghost cancellation reference (GCR) signal must be detected and stored digitally to be processed. The methods for the detection of this signal involve a determination of a particular line of the video signal from analog or digital video synchronization signal processors and then comparing this detected signal to a stored reference GCR signal. These processors are designed to accommodate standard NTSC signals or standard video signals with low S/N characteristics, but not ghosted signals. Ghosting causes the video synchronization levels to change dynamically line-to-line. Simple level-slicing methods are insufficient under ghosted signal conditions. This means that the horizontal synchronization pulses cannot be reliably counted with respect to the vertical interval, thereby introducing errors in determining the location of the GCR signal to be detected. Other methods involving sync. prediction use either differentiation or integration, or a combination of both, as feedback to the prediction algorithm. This means that the sync. processor can be stabilized, but the statistical error over a few lines can allow the predictor to be off by one or more lines resulting in an erroneous detection of the GCR signal.

SUMMARY OF THE INVENTION

It is an object of the present invention to provide a circuit for reliably detecting and synchronizing to the GCR signal.

This object is achieved in a circuit for detecting and synchronizing a ghost cancellation reference (GCR) signal in a television video signal, comprising means for receiving at least one field of an input video signal; means for finding a maximum correlation peak value in a field of said input video signal; means for scaling said maximum correlation peak value to a lower predetermined value for detection for forming a scaled peak value; means for synchronizing a next field of said video signal using said scaled peak value; and means for predicting a future position of the GCR signal.

The Koo GCR signal itself is a very high energy signal. If it is correlated with the stored reference GCR signal, the correlation peak is very definitive. The correlation is immune to low S/N ratios, dc-offsets generated by ghosting, and other video corruptions, such as VCR playbacks. The subject invention uses the ghost canceling filter as a match filter during predicted GCR signal times.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 1:
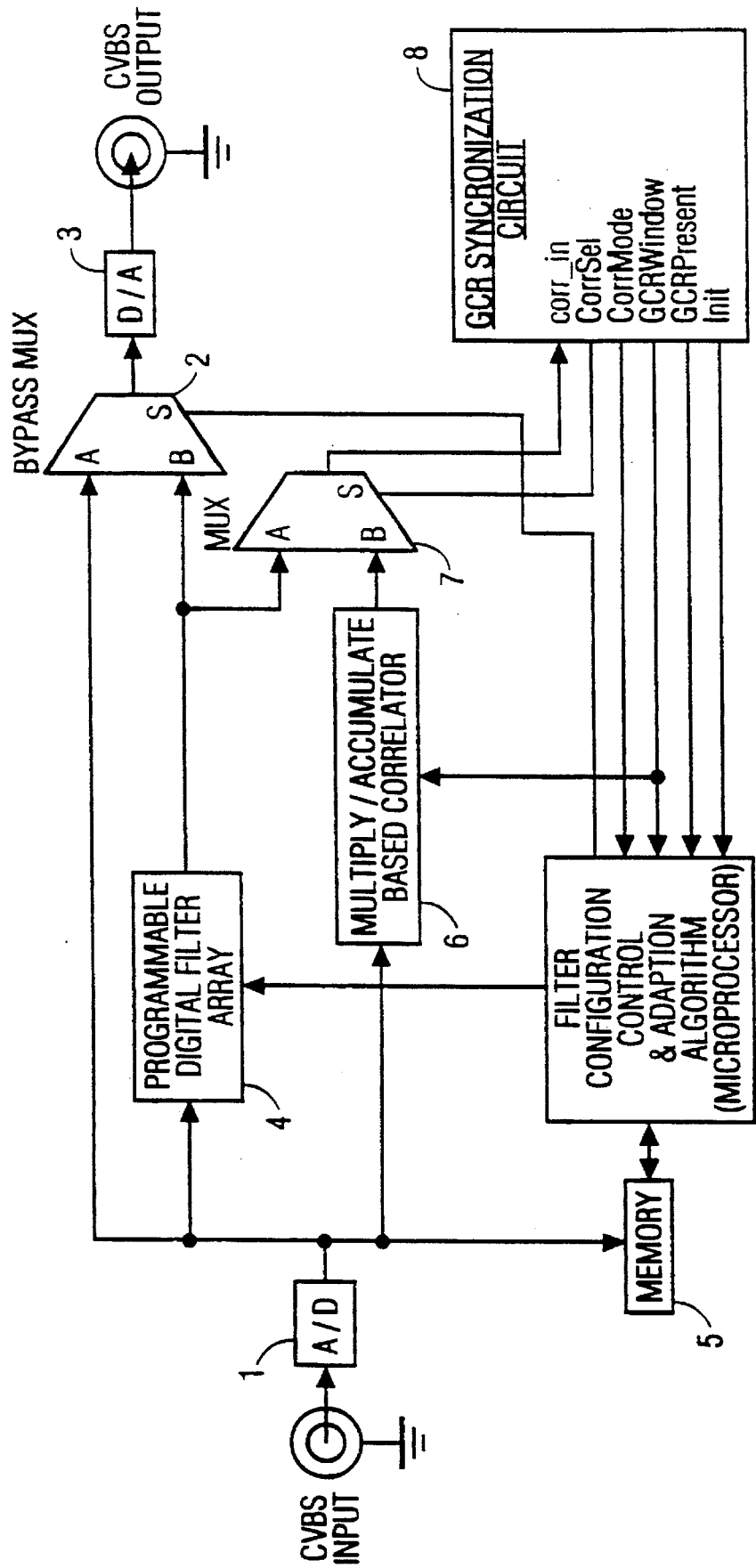
FIG. 1 shows a block diagram of the GCR detection and synchronization circuit of the subject invention.

FIG. 1 shows a block diagram of the GCR detection and synchronization circuit of the subject invention. A received video signal containing the GCR signal is digitized in an analog-to-digital (A/D) converter 1. An output of the A/D converter 1 is applied directly to a first input of a bypass multiplexer 2, the output from which is applied to a digital-to-analog (D/A) converter 3, the output therefrom forming the output of the circuit.

The output of the A/D converter 1 is also applied, through a programmable digital filter array (PDFA) 4, to a second input of the bypass multiplexer 2, to a memory 5, and to a multiply/accumulate based (MACB) correlator 6. An output from the MACB correlator 6 and the output from the PDFA 4 are applied to the first and second inputs, respectively, of a multiplexer 7, an output of which, comprising a correlation signal, is applied to a GCR synchronization circuit 8. The GCR synchronization circuit 8, in turn, supplies a correlation selection signal for switching the multiplexer 7.

The circuit also includes a filter configuration control and adaption algorithm circuit 9 for controlling the PDFA 4 and the bypass multiplexer 2. The circuit 9 is connected to receive and write information from/to the memory 5, and receives a correlation mode signal, a GCR window signal, a GCR present signal, and an initialization signal from the GCR synchronization circuit 8. The GCR window signal is also applied to a control input of the MACB correlator 6.

The circuit shown in FIG. 1 is a general architecture for a ghost cancellation system. The major circuit functionality consists of three primary modes of operation:

1. GCR Averaging
2. Channel Adaptation
3. Filter Coefficient Update

During averaging mode, the GCR signal must be accurately located, otherwise, erroneous averaging will occur. The GCR synchronization circuit 8 along with the MACB correlator 6 comprise the inventive approach to locating the GCR signal line accurately. Channel Adaptation and Filter Coefficient Update can be handled purely in software, and the GCR synchronization circuit 8 does not have a direct impact on these circuit functions.

The filter configuration control and adaptation algorithm circuit 9 may be implemented with any general purpose microprocessor (μp). The PDFA 4 must have approximately 500 taps, be user configurable as a single N-tap FIR filter, with user programable coefficients. Three Philips GB-180 filter chips may be used for the PDFA 4.

At power on, the GCR synchronization circuit 8 signals the μP to initialize, which resets the PDFA 4 and places the bypass multiplexer 2 in "BYPASS" mode. After initialization, the GCR synchronization circuit 8 signals the μP to configure the PDFA 4 in the correlation mode and to load the filter coefficients with the time-reversed GCR signal by activating the CorrMode signal line, which, in effect, turns the PDFA 4 into a real-time GCR cross correlator. When a correlation peak is detected by the GCR synchronization circuit 8, the peak value is scaled and stored. The GCR synchronization circuit 8 then measures and stores the time (ΔT) between correlation peaks. The stored ΔT is used to generate a "window" (GCR-Window), which is active for the length of the GCR signal. If a correlation peak is not detected, then the assumption made is that no GCR signal is present. Since de-ghosting is not possible without a received GCR signal, the circuit continuously searches for a correlation peak while the video is bypassed.

Once the correlation peak and ΔT values are determined, two modes of operation are possible. The first operating mode is to use the PDFA 4 as a real-time cross correlator during the active GCR-Window and a ghost cancellation filter for the inactive GCR-Window. This requires that the video signal be bypassed during the GCR-Window period. The second operating mode is to use the MACB correlator 6 to calculate the cross correlation between the stored GCR signal and the captured GCR signal off-line. By calculating "WinSize" points of the cross correlation, the GCR signal can be captured during the active GCR-Window period, and all relevant points of the cross correlation can be calculated by the MAC based correlator 6 before the next active GCR-Window period. In both cases, if a correlation peak is not detected, the INIT signal is activated and the circuit initializes from the same point as at power-up. If a correlation peak is detected, then the GCR-Present signal is asserted, which signals the μP to use the last captured GCR signal in the next averaging iteration. The advantage of using the MACB correlator 6 to perform the Windowed GCR synchronization function is that no video signal is bypassed.

Figure 2:
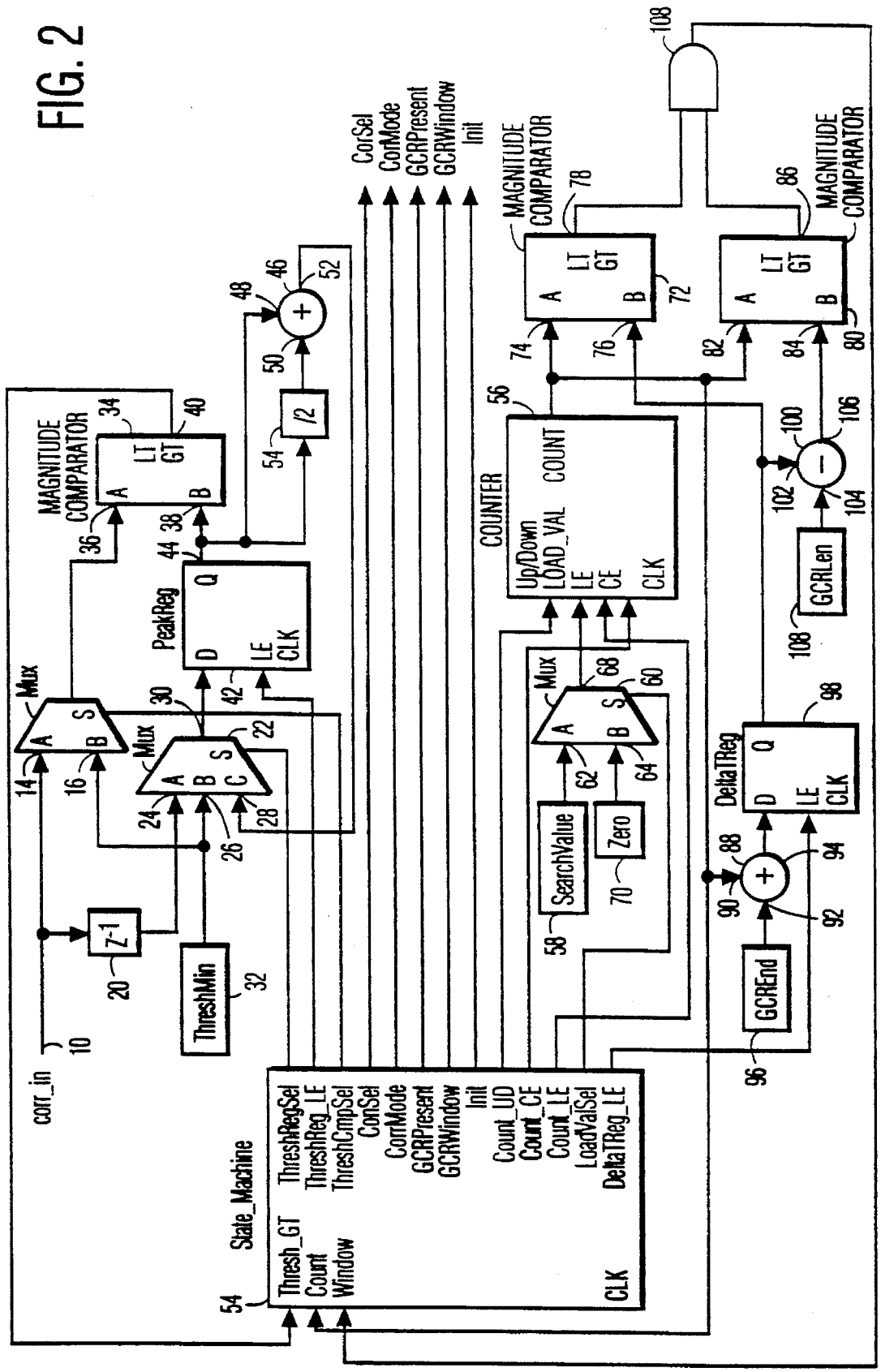
FIG. 2 shows a block diagram of the GCR synchronization circuit portion of the circuit of FIG. 1.

FIG. 2 shows a block diagram of the GCR synchronization circuit 8 of the circuit of FIG. 1. The correlation signal, received at input 10, is applied to a first input 14 of a first multiplexer 12. The correlation signal is also applied, through a delay circuit 20, to a first input 24 of a second multiplexer 22. A threshold generator 32 applies a minimum threshold signal to a second input 16 of the first multiplexer 12 and a second input 26 of the second multiplexer 22.

An output 18 of the first multiplexer 12 is applied to a first input 36 of a first magnitude comparator 34. An output 30 of the second multiplexer 22 is applied to a D input of a peak register 42 having a Q output 44 connected to a second input 38 of the first magnitude comparator 34. The output 44 of the peak register 42 is also applied to a first input 48 of an first adder circuit 46, and, via a divide-by-2 divider 54, to a second input 50 of the first adder 46. An output 52 from the first adder 46 is applied to a third input 28 of the second multiplexer 22.

An output 40 from the first magnitude comparator 34 is applied to a threshold-GT signal input of a state machine 54. The state machine 54 determines the presence of the GCR signal and generates a GCR-Present signal, a GCR-Window signal, an initialization signal (INIT), and a correlation mode (CorrMode) signal. In addition, the state machine 54 generates an up/down count (Count-UD) signal, a Count-CE count enable signal, and a count-LE latch enable signal. These signals are applied to an up/down switching input of a counter 56, and to a CE input and LE input thereof, respectively.

A search value generator 58 applies a search value signal to a first input 62 of a third multiplexer 60 which receives a zero signal on its second input 64 from a zero signal generator 70. An output 68 of the third multiplexer 60 is applied to a count value (LOAD-VAL) input of the counter 56.

A count value output of the counter 56 is applied to a first input 74 of a second magnitude comparator 72, a first input 82 of a third magnitude comparator 80, a count value input of the state machine 54, and a first input 90 of a second adder 88, a second input 92 of the second adder 88 receiving the output from a GCR-End signal generator 96, and an output 94 from the second adder being applied to a D input of a delta T register 98.

A delta T register latch enable signal LE is generated by the state machine 54 and is applied to the LE clock input of the delta T register 98. A Q output from the delta T register 98 is applied to the second input 76 of the second magnitude comparator 72 and to the first input 102 of a subtractor 100. A second input 104 of the subtractor 100 receives the output from a GCR-Len signal generator 108, and an output 106 from the subtractor 100 is applied to the second input 84 of the third magnitude comparator 80.

An output 78 of the second magnitude comparator 72 and an output 86 of the third magnitude comparator 80 are connected, respectively, to first and second inputs of an AND-gate 108, an output thereof being connected to a window signal input of the state machine 54.

The state machine 54 further generates a threshold comparison selection signal for switching the first multiplexer 12, a threshold register selection signal for switching the second multiplexer 22, a threshold register LE latch enable signal for the peak register 42, and a load value selection signal for switching the third multiplexer 60.

Figure 3:
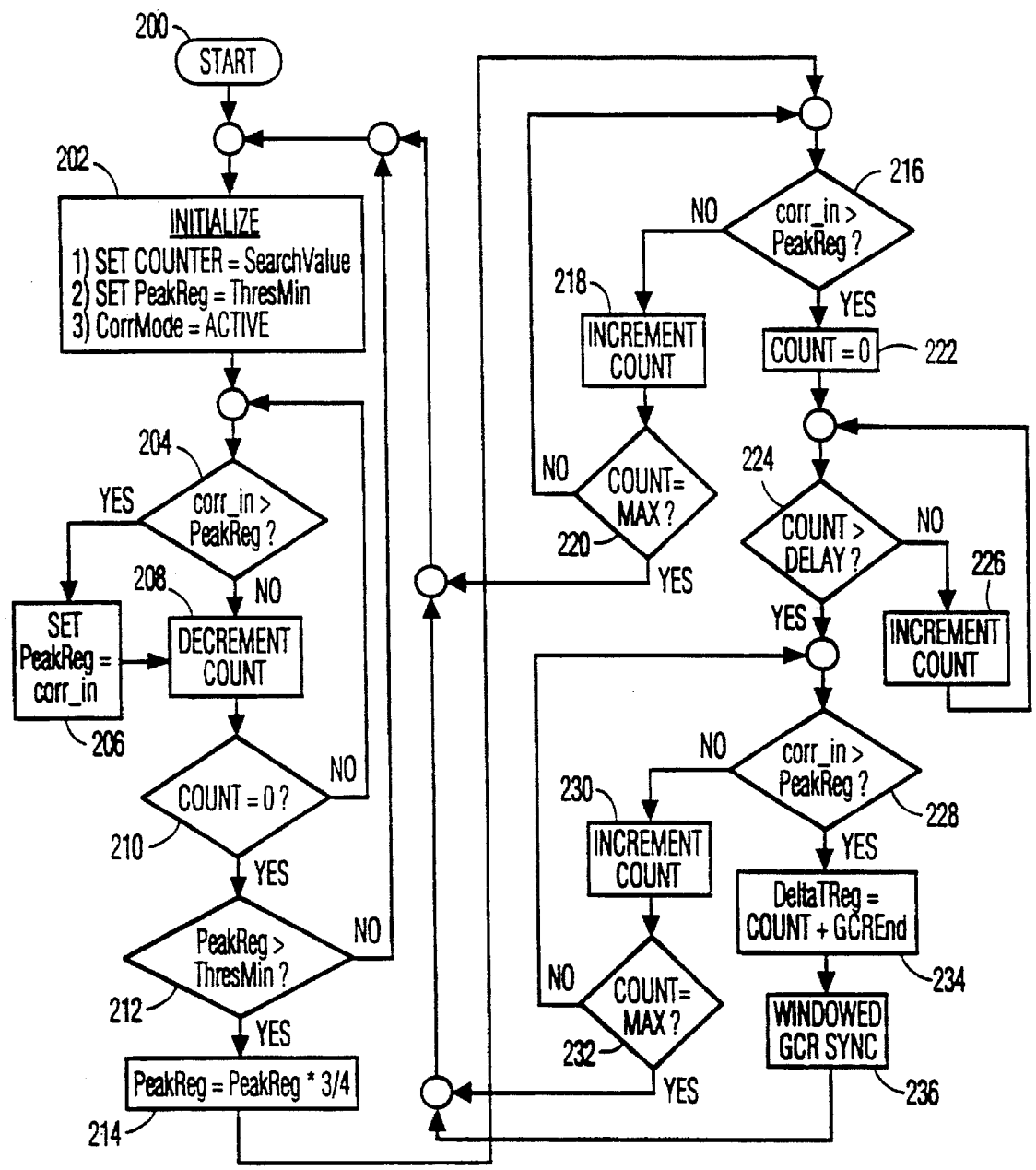
FIG. 3 shows a flowchart diagraming the operation of the circuit of FIG. 2.

FIG. 3 shows a flowchart of the operation of the GCR synchronization circuit 8, and, in particular, the state machine 54. After starting in block 200, initialization is instituted in block 202 in which the count value in the counter 56 is set to the search value, the peak register 42 is set to the threshold minimum and the correlation mode signal is set to be active. In block 204, a decision is made as to whether the correlation input signal is greater than the value in the peak register 42. If so, the current correlation input signal value is inputted into the peak register 42 in block 206 and the count value in the counter 56 is decremented in block 208. If not, the program proceeds directly to block 208 in which the count value in the counter 56 is decremented. Next, in block 210, it is determined whether the count value in the counter 56 is equal to zero. If not, the program reverts back to block 204 where the current correlation input signal is compared to the value in the peak register 42. If so, in block 212, the value in the peak register 42 is compared with the threshold minimum generated by the threshold generator 32. If this value is not equal to the threshold minimum, the program reverts to the initialization block 202. If so, in block 214, the peak register 42 is set equal to ¾ of its previous value via the divider 54 and the first adder 46.

The program then proceeds to block 216 in which the correlation input value is compared to the current value in the peak register 42. If the correlation input signal value is less than or equal to the current value in the peak register 42, in block 218, the count value in the counter 56 is incremented and, in block 220, it is determined whether the current count value in the counter 56 is equal to a predetermined maximum value. If so, the program reverts to block 202, while if not, the program reverts to block 216.

If, in block 216, the correlation input signal value is greater than the current value in the peak register 42, the count value in the counter 56 is set equal to zero in block 222, and in block 224, it is determined if the current count value is greater than a predetermined delay. If not, in block 226, the count value in counter 56 is incremented and the program reverts to block 224. If so, in block 228, the correlation input signal is compared to the current value in the peak register 42. If the current value of the correlation input signal is less than or equal to the current value in the peak register 42, the count value in the counter 56 is incremented in block 230 and then the current count value in the counter 56 is compared to the predetermined maximum value in block 232. If the current count value in the counter 56 is less than the predetermined maximum value, the program reverts to block 228. If the current count value in the counter 56 is equal to the predetermined maximum value, the program reverts to block 202.

If in block 228, the current value of the correlation input signal is greater than the current value in the peak register 42, in block 234, the delta T register 72 is set equal to the count value in the counter 56 plus the GCR-End signal. Then, in block 236, the GCR synchronization signal is windowed. The program then reverts to the initialization block 202.

Figure 4:
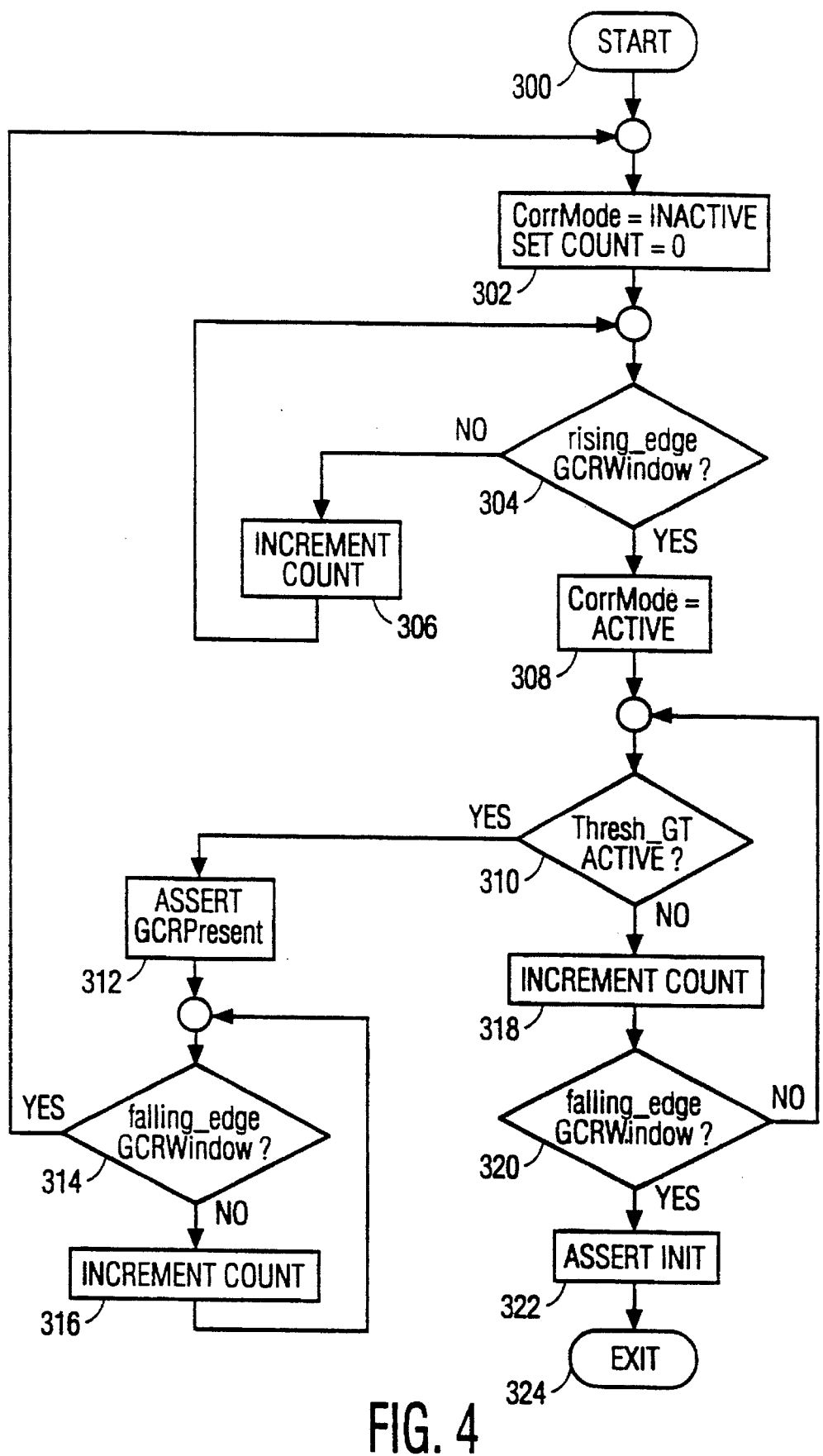
FIG. 4 shows a flowchart diagraming a windowing operation when the PDFA is used as a real-time cross correlator.

The procedure for the windowing of the GCR sync. using the PDFA 4 is shown in the flowchart of FIG. 4. After starting in block 300, the correlation mode signal is set to be inactive and the counter 56 is set to zero in block 302. Next, in block 304, it is determined whether there is a rising edge in the GCR-Window signal. If not, the count value in the counter 56 is incremented in block 306 and the program reverts to block 304. If so, the correlation mode signal is set to be active in block 308, and then, in block 310, a decision is made as to whether the Threshold-GT signal is active. If so, in block 312, a signal is generated indicating that the GCR is present and then in block 314, it is determined whether there is a falling edge in the GCR-Window signal. If not, in block 316, the count value in the counter 56 is incremented and the program reverts to block 314. If so, the program reverts to the block 302. If, in block 310, it is determined that the Threshold-GT signal is not active, the count value in the counter 56 is incremented in block 318 and in block 320, it is determined whether a falling edge is in the GCR-Window signal. If not, the program reverts to block 310. If so, in block 322, an initialization signal is generated and the program is exited at block 324.

Figure 5:
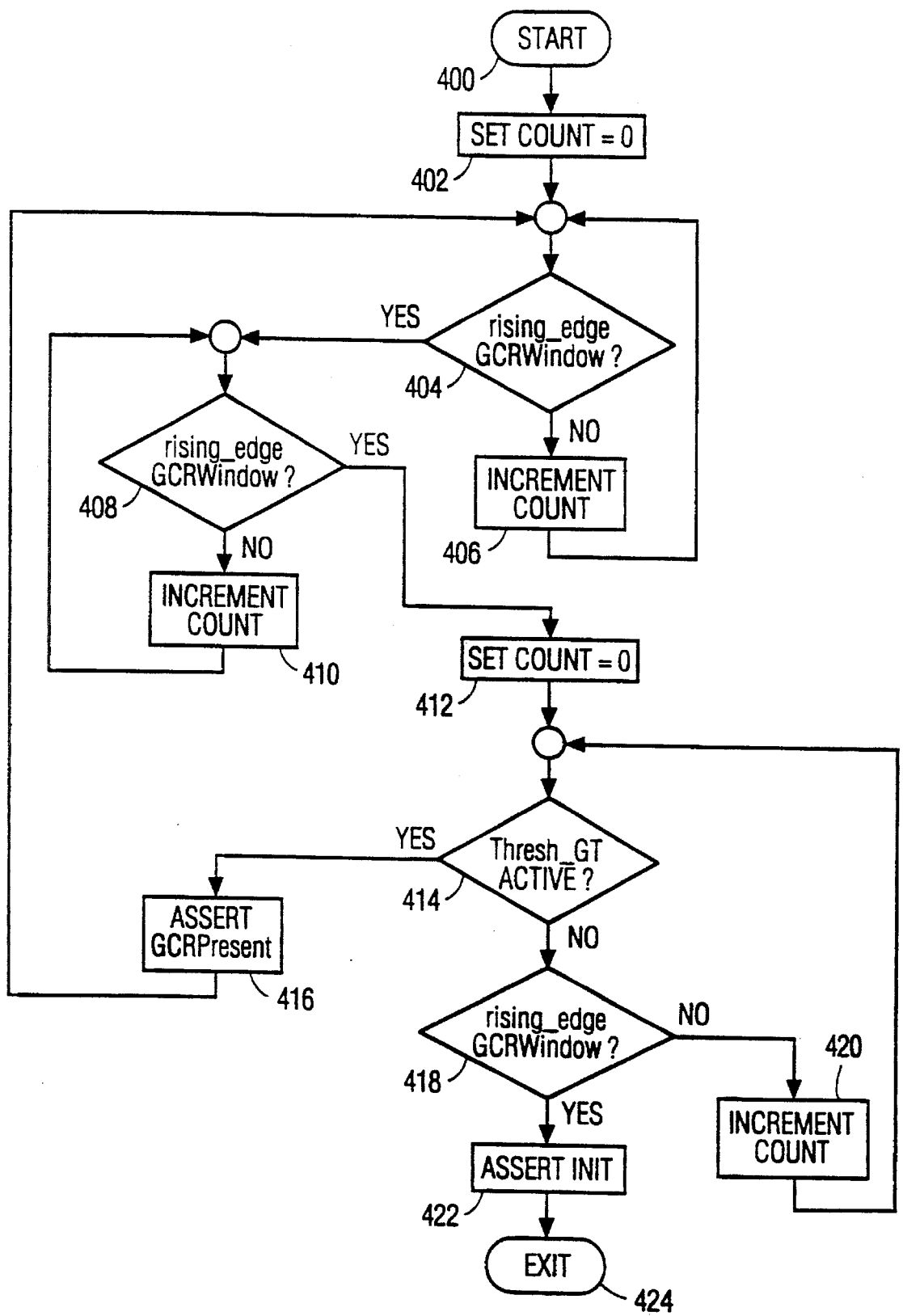
FIG. 5 shows a flowchart diagraming the windowing operation when the multiply/accumulate based correlator is used to calculate the cross correlation.

The procedure for the windowing of the GCR sync. using the MACB correlator 6 is shown in FIG. 5. After starting in block 400, in block 402, the count value in the counter 56 is set to zero. Then in block 404, it is determined whether there is a rising edge in the GCR-Window signal. If not, the count value in the counter 56 is incremented in block 406 and then the program reverts to block 404. If so, in block 408, it is determined whether there is a falling edge in the GCR-Window signal. If not, the count value in the counter 56 is incremented in block 410 and the program goes back to block 406. If so, in block 412, the count value in counter 56 is set to zero and, in block 414, it is determined whether the Threshold-GT signal is active. If so, then in block 416, a signal is generated indicating that the GCR is present and then the program reverts to block 406. If not, it is determined whether there is a rising edge in the GCR-Window signal in block 418. If not, in block 420, the count value in the counter 56 is incremented and the program reverts to block 414. If so, in block 422, an initialization signal is generated and the program is exited at block 424.

Figure 6:
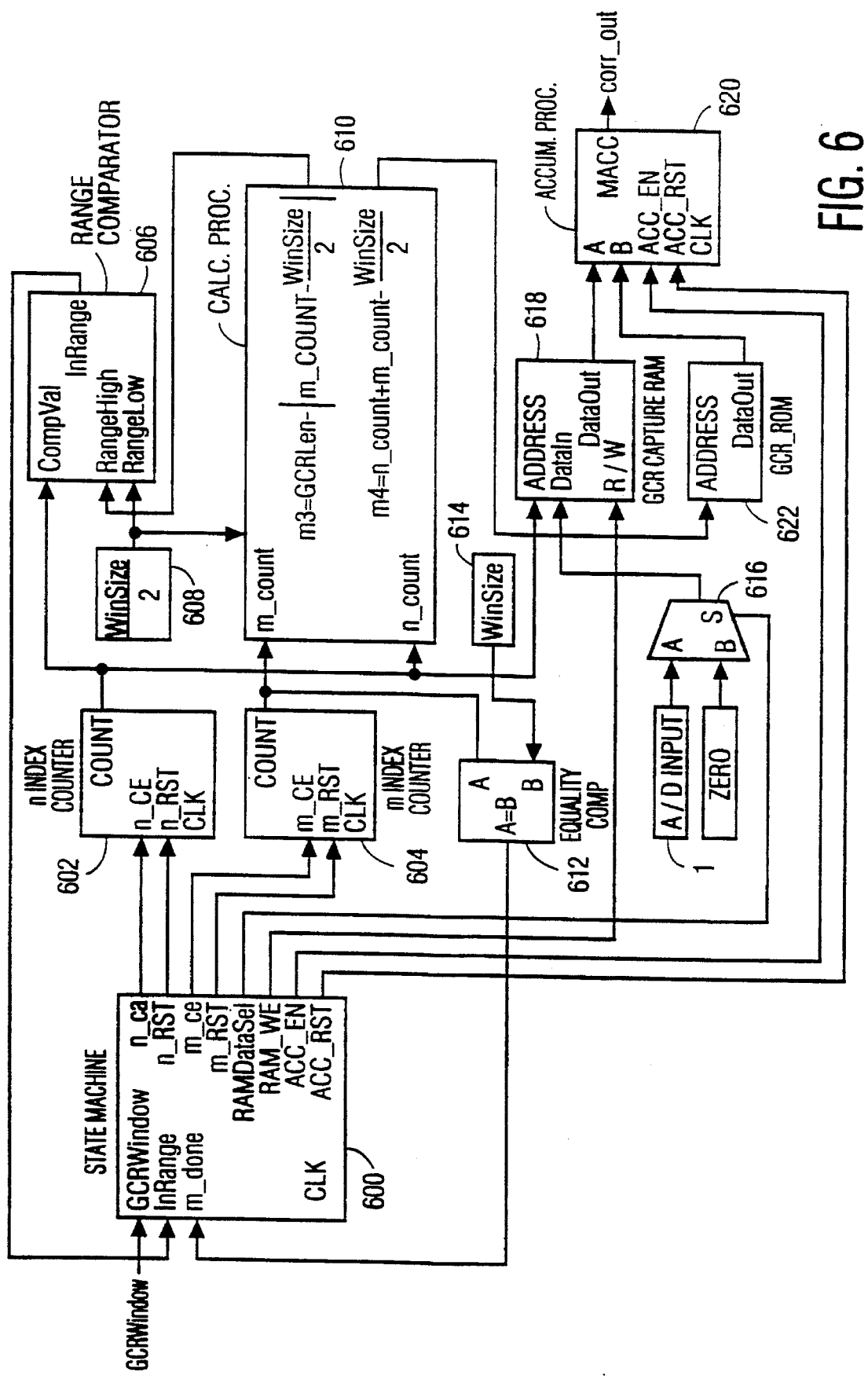
FIG. 6 shows a block diagram of the multiply/accumulate based correlator.

FIG. 6 shows a block diagram of the MACB correlator 6. The GCR-Window signal is applied to a state machine 600 which selectively applies an n-CE signal and an n-RST signal, and an m-CE signal and an m-RST signal to respective inputs of an n index counter 602 and an m index counter 604. The count output from the n index counter 602 is applied to a CompVal input of a range comparator 606 which receives the signal WinSize/2 from a generator 608 at a RangeLow input. The count output from the n index counter 602 and the WinSize/2 signal from generator 608 are also applied to respective inputs of a calculation processor 610. The count output from the m index counter 604 is applied to a m-count input of the calculation processor 610, and to a first input of all equality comparator 612. A second input of the equality comparator 612 receives the WinSize signal from a generator 614 and applies its output to an m-done input of the state machine 600.

The calculation processor 610 performs the following calculations:

$$m1=GCR\text{-}Len-|m\text{-}count-WinSize/2|;$$

and $$m2=n\text{-}count+m\text{-}count-WinSize/2.$$

A first output from the calculation processor 610, carrying the signal m1, is applied to a RangeHigh input of the range comparator 606 which applies an InRange signal at its output to an InRange input of the state machine 600.

A multiplexer 616 receives the output from the A/D converter 1 at a first input and a zero signal at a second input. The state machine 600 applies a RAMDataSel signal to a switching input of the multiplexer 616. An output from the multiplexer 616 is applied to a data input of a GCR capture RAM 618, which receives, at its address input, the output signal from the n index counter. An R/W (read or write) signal is applied by the state machine to an R/W input of the RAM 618, while an output from the RAM 618 is applied to an A input of an accumulation processor 620.

A second output from the calculation processor 610, carrying the signal m2, is applied to the address input of a GCR-ROM 622 which applies its DataOut signal to a B input of the accumulation processor 620. The state machine applies an ACC-EN signal and an ACC-RST signal to the accumulation processor 620.

The accumulation processor 620 determines the calculation MACC=MACC+A*B, which is applied to its output as the correlation output.

Figure 7:
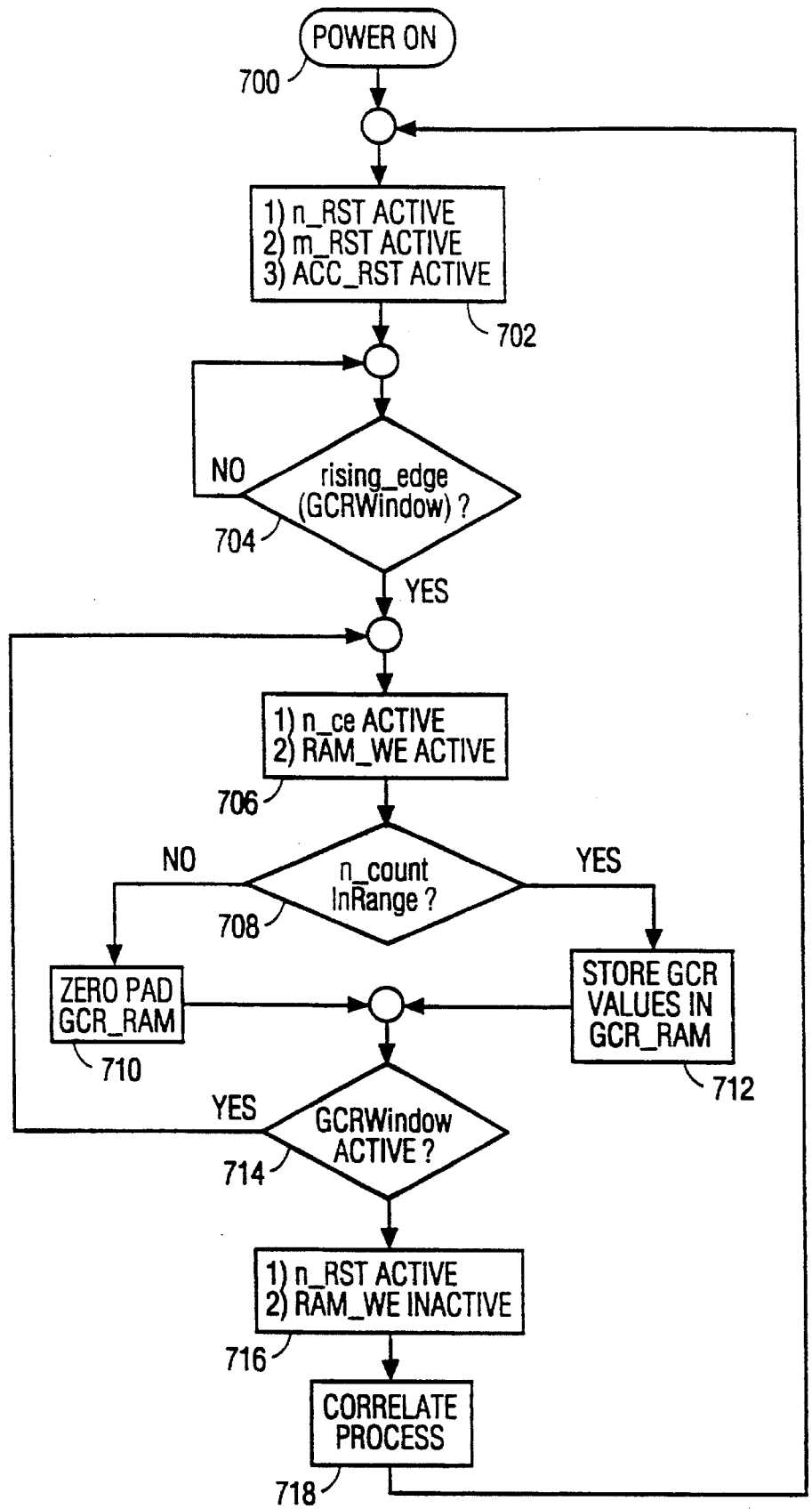
FIG. 7 shows a flowchart diagraming the capturing of the zero padded GCR signal.

FIG. 7 shows the procedure for capturing the zero padded GCR. After POWER ON in block 700, the n-RST signal, the m-RST signal and the ACC-RST signal are made active in block 702. Then, in block 704, it is determined whether there is a rising edge in the GCR-Window signal. If not, the program reverts to block 704. If so, in block 706, the n-CE signal and the RAM-WE signal are made active. Next, in block 708, it is determined whether the n-count is in range. If not, the zero pad value is stored in the GCR-RAM in block 710, while if so, the GCR values are stored in the GCR-RAM in block 712. In either case, the program then proceeds to block 714 where it is determined whether the GCR-Window signal is active. If so, the program reverts to block 706, while in the alternative, in block 716, the n-RST signal is made active and the RAM-WE signal is made inactive. The program then proceeds to the correlation process in block 718 and then reverts to block 702.

Figure 8:
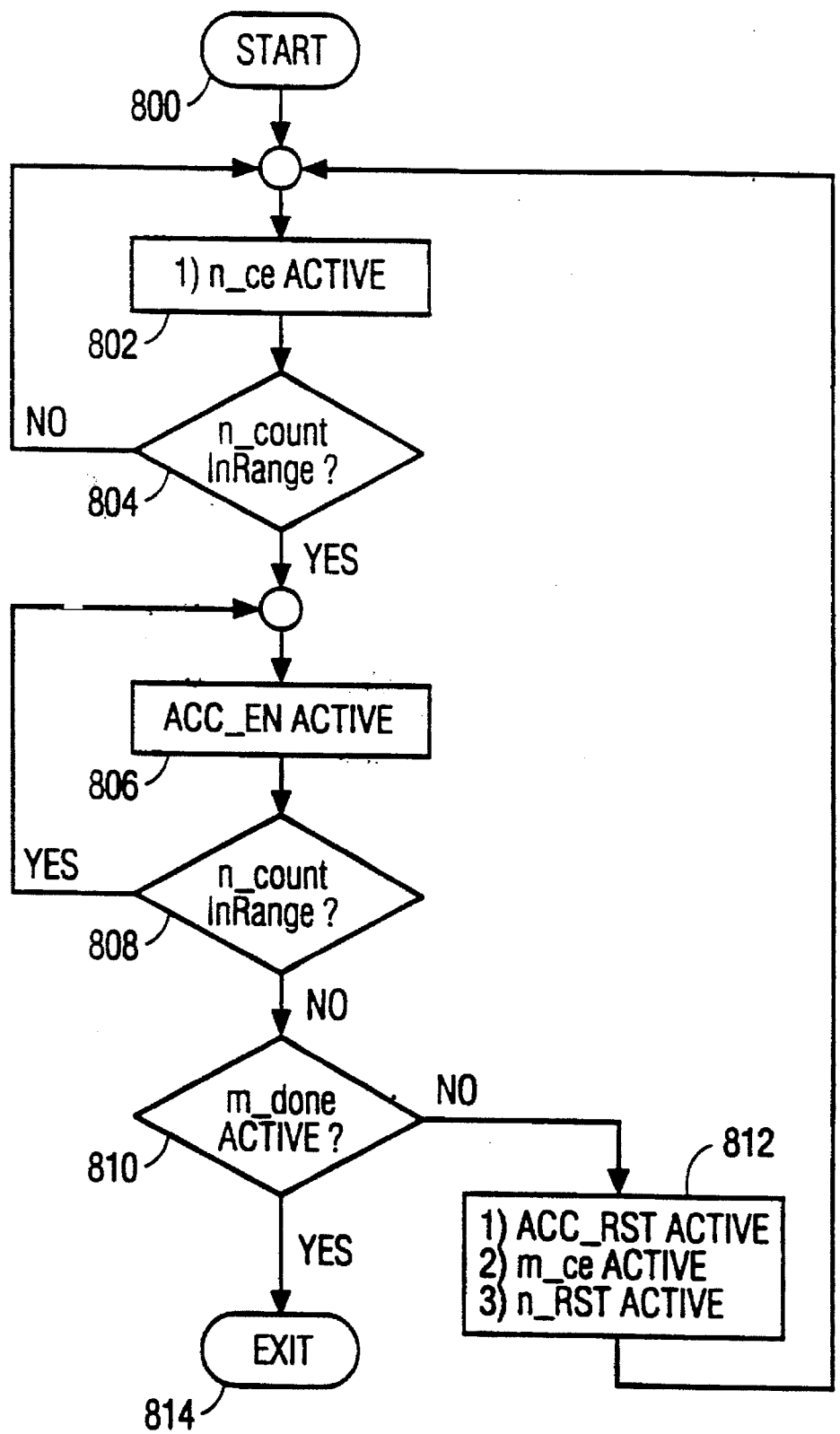
FIG. 8 shows a flowchart diagraming the correlation of WinSize point of cross correlation.

FIG. 8 shows the procedure for correlation of WinSize points of cross correlation. After starting at block 800, the n-CE signal is made active in block 802. In block 804, it is determined whether the n-count is in range. If not, the program reverts to block 802. If so, the ACC-EN signal is made active in block 806. In block 808, it is determined whether the n-count is in range. If so, the program reverts to block 806. If not, in block 810, it is determined whether the m-done signal is active, if not, in block 812, the ACC-RST signal, the m-CE signal and the n-RST signal are made active and the program reverts to block 802. If so, the program exits at block 814.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A circuit for detecting and synchronizing a ghost cancellation reference (GCR) signal in a television video signal, comprising:

means for receiving at least one field of an input video signal;

means for finding a maximum correlation peak value in a field of said input video signal;

means for scaling said maximum correlation peak value to a lower predetermined value for detection and for forming a scaled peak value;

means for synchronizing a next field of said video signal using said scaled peak value; and means for predicting a future position of the GCR signal.

2. The circuit as claimed in claim 1, characterized in that said circuit further comprises means for opening a window to test for a next correlation peak in a subsequent field of the video signal.

3. The circuit as claimed in claim 1, characterized in that said means for predicting a future position of the GCR comprises a video de-ghosting filter.

4. The circuit as claimed in claim 3, characterized in that said video de-ghosting filter is shared with circuits for performing de-ghosting of the video signal.

5. The circuit as claimed in claim 3, characterized in that said video de-ghosting filter comprises a separate GCR match filter.

* * * * *